(12) United States Patent
Nakane

(10) Patent No.: US 6,350,149 B1
(45) Date of Patent: Feb. 26, 2002

(54) STRUCTURE OF ELECTRICAL TERMINALS FOR ESTABLISHING ELECTRICAL CONTACT BETWEEN A BATTERY PACK AND AN ELECTRICAL DEVICE

(75) Inventor: Shin-ichi Nakane, Okazaki (JP)

(73) Assignee: Makita Corporation, Anjo (JP)

(*) Notice: Subject to any disclaimer, the term of this patent is extended or adjusted under 35 U.S.C. 154(b) by 0 days.

(21) Appl. No.: 09/638,332

(22) Filed: Aug. 14, 2000

(30) Foreign Application Priority Data

Aug. 19, 1999 (JP) .......................................... 11-233232

(51) Int. Cl.⁷ ................................................. H01R 3/00
(52) U.S. Cl. ........................................ 439/500; 439/929
(58) Field of Search ................................ 439/500, 929, 439/374; 429/97; 307/150; 320/150, 429

(56) References Cited

U.S. PATENT DOCUMENTS

| | | | | |
|---|---|---|---|---|
| 4,447,749 A | * | 5/1984 | Reeb, Jr. et al. | 310/71 |
| 5,251,329 A | * | 10/1993 | Takagi et al. | 455/89 |
| 5,769,657 A | * | 6/1998 | Kondo et al. | 439/500 |
| 5,792,573 A | | 8/1998 | Pitzen et al. | 429/97 |
| 5,928,020 A | * | 7/1999 | Bishop, Jr. et al. | 439/188 |
| 6,057,608 A | * | 5/2000 | Bailey, Jr. et al. | 307/43 |
| 6,139,359 A | * | 10/2000 | Fuhreck et al. | 439/500 |
| 6,152,789 A | * | 11/2000 | Byrd et al. | 439/862 |
| 6,168,881 B1 | * | 1/2001 | Fischer et al. | 429/96 |
| 6,181,032 B1 | * | 1/2001 | Marshall et al. | 307/150 |
| D437,579 S | * | 2/2001 | Toops et al. | D13/103 |

* cited by examiner

*Primary Examiner*—Tulsidas Patel
(74) *Attorney, Agent, or Firm*—Lahive & Cockfield, LLP (57) ABSTRACT

A battery pack (1) has two female terminals (7) each including two pairs of elastic plates (10). Each pair of elastic plates (10) are arranged symmetrically about a base plate (8). Each elastic plate (10) includes a parallel portion (11) oriented parallel to its counterpart of the paired elastic plate (10). Also included in each plate (10) is a contact pressure portion (12) which is bent from one end the parallel portion (11) so as to extend into contact with its counterpart of the paired elastic plate (10). The contact pressure portion (12) is bent back at the contact point such that a small gap is formed between the free ends of the paired pressure portions. A device to which the battery pack (1) is attached, such as an electric power tool or a charger, includes male terminals (17) to be coupled to the pack. By specifying the length of the male terminals (17), an appropriate level of contact pressure can be selected for the terminals (7, 17).

12 Claims, 5 Drawing Sheets

Fig. 6

STRUCTURE OF ELECTRICAL TERMINALS FOR ESTABLISHING ELECTRICAL CONTACT BETWEEN A BATTERY PACK AND AN ELECTRICAL DEVICE

This application claims priority on Japanese Patent Application No. 11-233232 filed on Aug. 19, 1999, the contents of which are incorporated herein by reference.

BACKGROUND OF THE INVENTION

1. Field of the Invention

The present invention relates to a structure of electrical terminals provided in a rechargeable battery pack and an electrical device, such as an electric power tool or a battery charger, for establishing electrical contact therebetween when the pack is attached to the device.

2. Description of the Related Art

Various structures for establishing electrical contact between a rechargeable battery pack and electrical devices, such as electric power tools and battery chargers, are well known in the art. In one such attachment structure for establishing electrical contact, male terminals are mounted on the battery pack, whereas female terminals to be coupled with the male terminals are mounted on the electrical device. Tile contact pressure between the mating terminals of a battery pack and an electrical device need be selected in accordance with the device's specific operating conditions so as to prevent, for example, heat buildup and/or chattering at the mating terminals due to high voltage, large currents, and/or vibration caused by the operation of such electrical devices. Therefore, different female terminals with different contact pressures have been mounted on different types of electrical devices to obtain a suitable level or degree of contact pressure for each application.

While such a structure of electrical terminals is generally acceptable, it is not free from certain drawbacks, thus leaving room for improvement. One drawback is the increased manufacturing cost and extra time and labor required for manufacturing and mounting different types of female terminals on different devices/apparatuses (to provide different degrees of contact pressure or different contact pressure levels). Moreover, there is a possibility of short circuits occurring between the exposed male terminals provided on the battery pack according to the foregoing structure. In order to prevent short circuits, it would be preferable for the battery pack to be provided with female terminals. If this is the case, however, the battery pack terminals will have one fixed contact pressure level, such that providing male terminals with different thicknesses for electric devices having different operating conditions will be the only means of realizing a range of contact pressure. However, the range of contact pressure afforded by this means is generally limited and thus short of a required level. Alternatively, it is possible to employ male/female terminal combinations having high contact pressure for all terminal connections in order to cover a range of applications that require different levels of contact pressure. In this case, however, the connection between all mating terminals may become exceedingly firm even for the type of applications that do not require very firm terminal connection. An added problem with this solution is that the high contact pressure often results in shortened service life of the terminals.

SUMMARY OF THE INVENTION

In view of the above-identified problems, an important object of the present invention is to provide a simple, reliable structure of electrical terminals that offers several levels of contact pressure.

Another object of the present invention is to provide a simple, reliable structure of electrical terminals that effectively prevents short circuits between terminals and cuts manufacturing costs.

The above objects and other related objects are realized by the invention, which provides a structure of electrical terminals for establishing electrical contact between a battery pack and an electrical device by attachment of the battery pack to the electrical device. The structure comprises a plurality of female terminals provided in the battery pack, and a plurality of male terminals provided in the electrical device and adapted to be coupled to the female terminals. In this structure, each of the female terminals includes at least two pairs of elastic plates, each pair of elastic plates being capable of holding one of the male terminals therebetween when the battery pack is attached to the electrical device. Further, the elastic plate pairs of each female terminal are disposed along the path of movement of the male terminal when the battery pack is attached to the electrical device such that the number of elastic plate pairs of each female terminal that hold each male terminal therebetween is determined by the length of the male terminal along the aforementioned path of movement.

This structure of electrical terminals according to the present invention permits the male terminals to be held between a selected number of elastic plate pairs and also permits selection of any appropriate level of contact pressure at the terminals from a plurality of levels, in accordance with the voltage, current, and/or the vibration level in a specific application. This effectively prevents heat buildup and chattering at the terminals. In addition, as the contact pressure on the terminals can be adjusted simply by changing the length of the male terminals without changing the dimensions and/or the shape of the female terminals, a significant cost reduction can be afforded. Moreover, as the female terminals are not exposed to the outside of the battery pack, short circuits can be effectively prevented.

A typical battery pack reaches the end of its service life sooner than the electrical device (e.g., the charger or the tool) with which the pack is used, and needs to be replaced as the cells in the pack deteriorate after a certain number of cycles of charge and discharge. It follows, therefore, that male terminals, which generally have longer life than female terminals, should be employed on the main device to which the pack is attached, with female terminals mounted on battery pack. Unlike conventional structures, the foregoing structure of the invention advantageously employs this logical arrangement of mounting male terminals on the main device and female terminals on the battery pack.

According to one aspect of the present invention, the structure includes two female terminals and two male terminals, each of which male terminals is adapted to be electrically connected to one of the two female terminals. The two female terminals are disposed in parallel to one another and are spaced apart by a first selected distance, and the two male terminals are disposed generally in parallel to one another and are spaced apart by the selected first distance.

According to another aspect of the present invention, each elastic plate includes a parallel portion which extends parallel to the aforementioned path of movement and a contact pressure portion which is bent at an angle to the parallel portion from one end of the parallel portion so as to extend into contact with the paired elastic plate at a point.

Furthermore, each of the male terminals includes a strip having a sufficient length along the aforementioned axis to come into contact with at least one of the elastic plate pairs at the aforementioned point, separate the contact pressure portions, and reach beyond the aforementioned point when the battery pack is attached to the electric device.

According to still another aspect of the present invention, the parallel portions of each elastic plate pair are separated from each other by a selected space sufficient to dispose at least part of the strip of the corresponding male terminal therebetween. In addition, each pair of elastic plates is arranged such that, during attachment of the battery pack to the electric device, the male terminal is first slid relative to the electrical device to enter the aforementioned space between the parallel portions, after which the male terminal separates the contact pressure portions at the aforementioned point.

According to yet another aspect of the present invention, each elastic plate includes at least one slit therein formed in the direction substantially parallel to the aforementioned path of movement of the male terminal so as to divide the contact pressure portion into a plurality of elastic pieces.

According to one feature of the present invention, each contact pressure portion is divided into two elastic pieces with an identical width.

In accordance with another feature of the present invention, each contact pressure portion is divided into two elastic pieces with different widths. The slit in each elastic plate provides different natural vibrations for the divided pieces of the elastic plate so as to reduce chattering due to vibration caused, for example, by the operation of the electric power tool.

According to still another feature of the present invention, the strip of each male terminal is sized and dimensioned so as to separate the two pairs of contact plates of the corresponding female terminal.

According to yet another feature of the present invention, the strip of each male terminal is sized and dimensioned so as to separate only one pair of contact plates of the corresponding female terminal.

In accordance with one practice of the present invention, the strip of each male terminal has a substantially rectangular shape.

In accordance with another practice of the present invention, each pair of contact pressure portions applies a selected level of contact pressure on the male terminal when the battery pack is attached to the electric device.

In one embodiment, the electrical device is selected from a group consisting of electric power tools and battery chargers.

Other general and more specific objects of the invention will in part be obvious and will in part be evident from the accompanying drawings and descriptions which follow.

BRIEF DESCRIPTION OF THE ATTACHED DRAWINGS

For a fuller understanding of the nature and objects of the present invention, reference should be made to the following detailed description and the accompanying drawings, in which.

DETAILED DESCRIPTION OF THE PREFERRED EMBODIMENT

A preferred embodiment according to the present invention will be described hereinafter with reference to the attached drawings.

Figure 1:
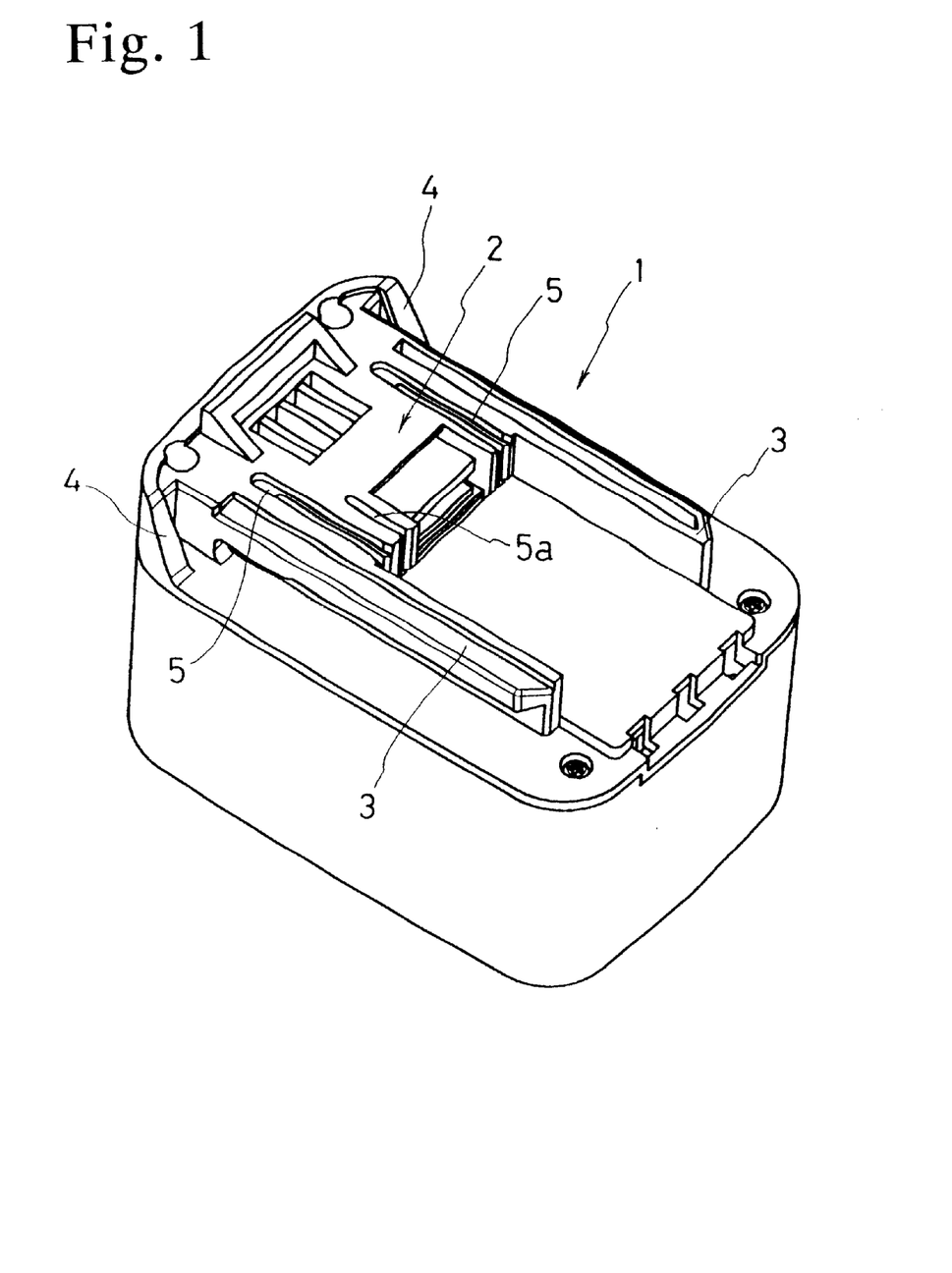
FIG. 1 is a perspective view of the exterior of a battery pack 1 according to the present invention.
Figure 2:
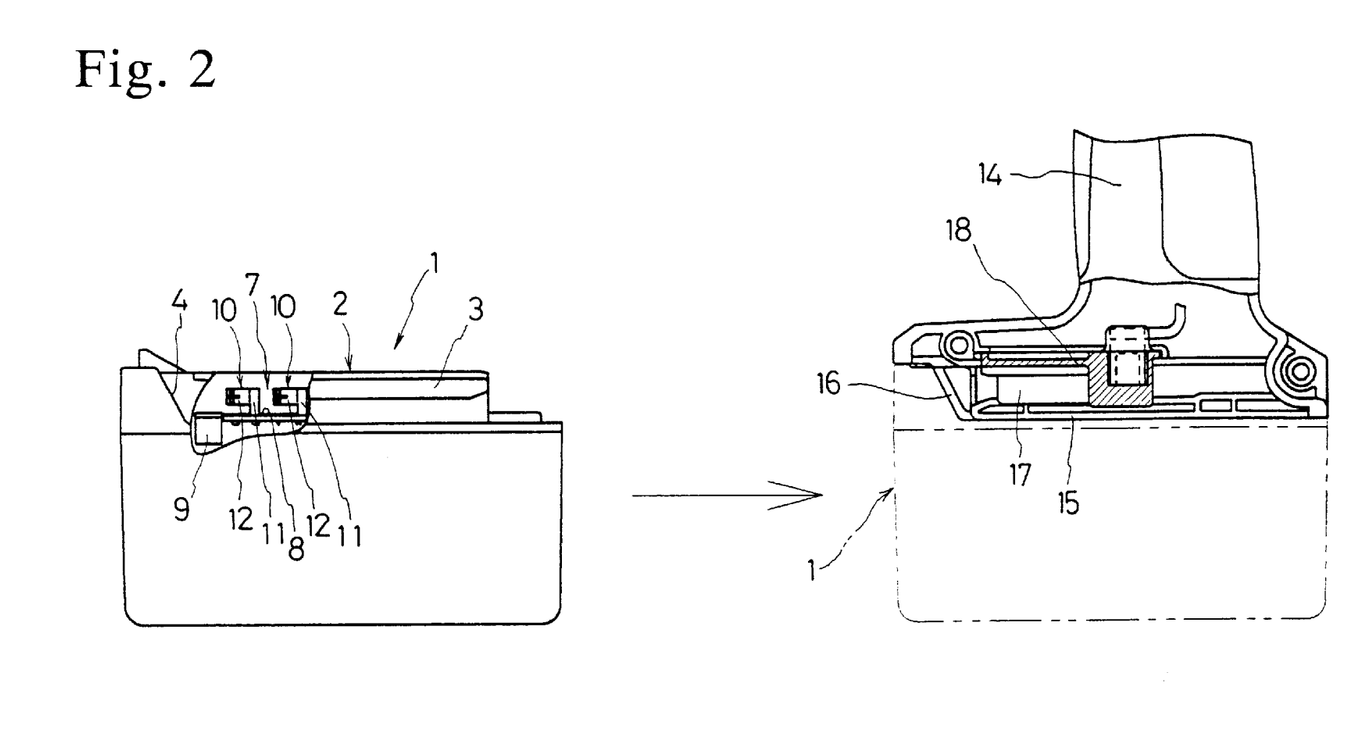
FIG. 2 shows how the battery pack of FIG. 1 is attached to an electric power tool.

FIG. 1 is a perspective view of the exterior of battery pack 1 in accordance with the present invention. The battery pack 1 is a generally box-shaped enclosure which is made of synthetic resin and contains a plurality of rechargeable cells (not shown). In addition, the battery pack 1 includes at its top surface a connecting portion 2 for attachment to the bottom end of an electric power tool or a battery charger and a pair of slide portions 3 each having an inverted L-shaped cross-section provided on one side of the connecting portion 2. Also referring to FIG. 2, to attach the battery pack 1 to a device, such as an electric power tool, the slide portions 3 are slid along the bottom of the electric power tool handle grip 14 to be secured by a holding portion 15 formed at the bottom of the handle grip. More particularly, the battery pack 1 is first slid in a direction generally orthogonal to the longitudinal axis of the handle grip 14 with the connecting portion 2 engaging the holding portion 15. The pack 1 continues to be slid until a pair of stoppers 4 formed rear of the connecting portion 2 (upward in FIG. 2) stop when they come into abutment with a respective stoppers 16 of the handle grip 14. At the same time, three male terminals 17 and 17a provided at the bottom of the tool handle grip 14 enter respective slits 5 and 5a formed in the connecting portion 2 to establish electrical contact with respective female terminals 7 and 7a in the portion 2. Although not shown, the battery charger of the present invention for use with the battery pack 1 has an identical terminal structure with that of the foregoing electrical power tool, such that the manner of connection of the battery pack 1 to the battery charger is identical with the above.

Figure 3:
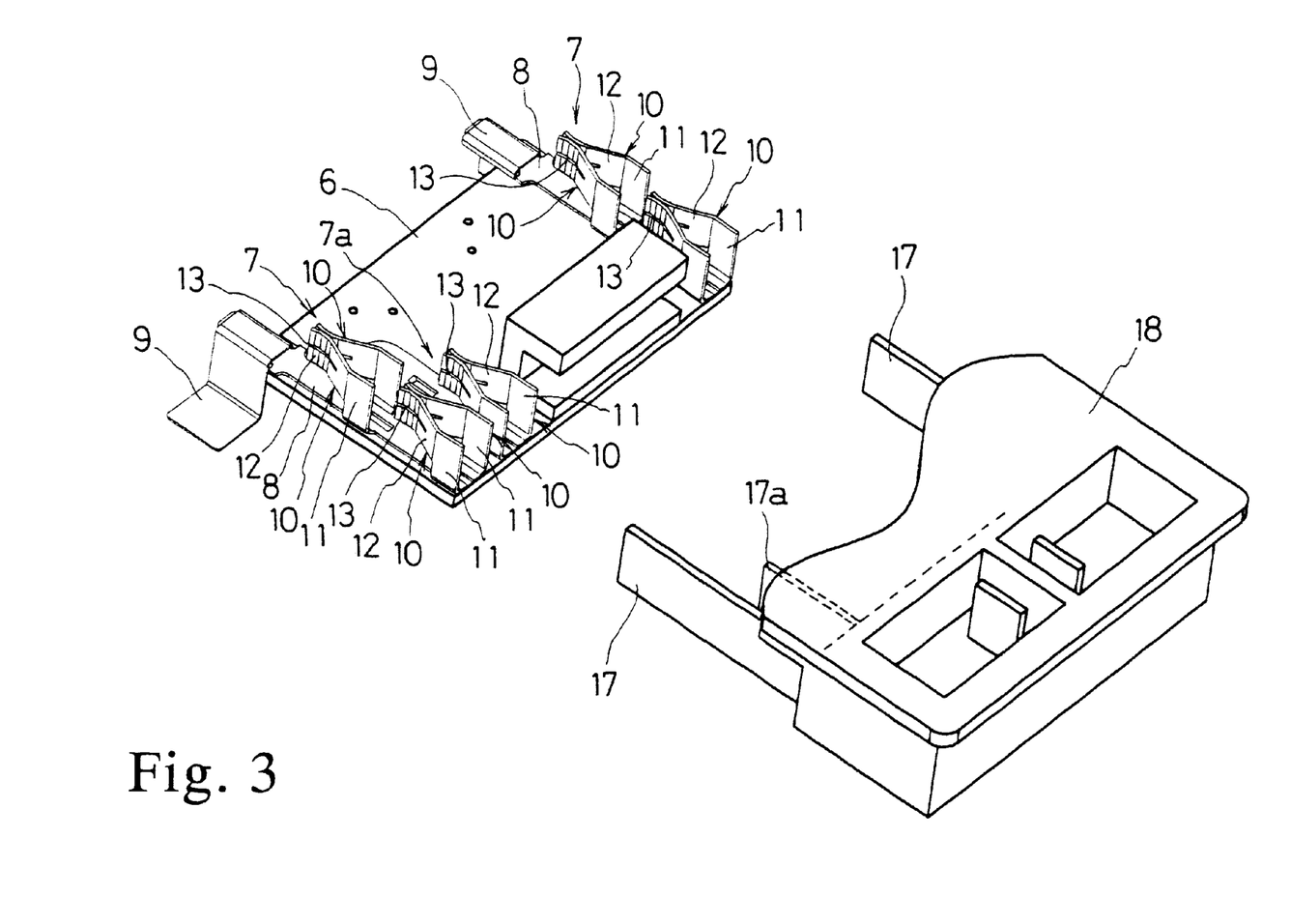
FIG. 3 is a perspective view of the terminal attachment structure of the battery pack of FIG. 1 and the electric power tool of FIG. 2.

With reference to FIG. 3, each female terminal 7 includes a base plate 8 secured parallel to the slits 5 and 5a on a support plate 6 of the connecting portion 2, a lead plate 9 coupled to the rear end of the base plate 8 at one end and abutting one of the rechargeable cells at the other end, a plurality of paired elastic plates 10 erected generally upright at the longitudinal sides of the base plate 8. In this embodiment, the two female terminals 7 provided at both sides of the support plate 6 are the positive and negative terminals for charging and discharging of the cells. As shown, each terminal 7 includes two pairs of elastic plates 10 with each pair symmetrically arranged across the base plate 8. The terminal 7a, which includes a pair of elastic plates 10 but no lead plate 9, is provided for transmitting signals indicative of detected cell temperature. Each elastic plate 10 has a parallel portion 11 which is oriented parallel to its counterpart of the paired elastic plate 10 when assembled. Also included in each elastic plate 10 is a contact pressure portion 12 which is bent from one end of the parallel portion 11 so as to extend rearward into contact with its counterpart of the paired elastic plate 10. The contact pressure portion 12 is bent back at the contact point such that a small gap is formed between the free ends of the paired pressure portions 12. Each contact pressure portion 12 is partially divided into two equal vertical widths by a slit 13 formed laterally into the portion 12 from its free end.

Still referring to FIG. 3, the handle grip 14 includes a terminal block 18 which supports the rectangular male terminals 17 with the same spacing therebetween as between the slits 5 so as to permit the terminals 17 to enter the slits 5 when the battery pack 1 is attached to the handle grip 14. It should be noted that the length of the male terminals 17 along the direction of entry is determined by the required contact pressure. More particularly, if a relatively high voltage or a large current is required, or if the electric power tool is likely to be subjected to extreme vibration, a large contact pressure is generally necessary. Employed for that purpose are long male terminals 17 that extend beyond the rear ends of the rear elastic plates 10 when the battery pack 1 is set in place. Conversely, if a relatively low voltage or a small current is required, or if the electric power tool is not subjected to extreme vibration, a large contact pressure is not generally required, so that shorter male terminals 17, which extend only beyond the rear ends of the front elastic plates 10 but do not reach the rear plates 10 when the battery pack 1 is set in place, are employed. As the data transmission female terminal 7a includes only one pair of elastic plates 10, the corresponding male terminal 17a supported on the terminal block 18 is made accordingly short.

Figure 4:
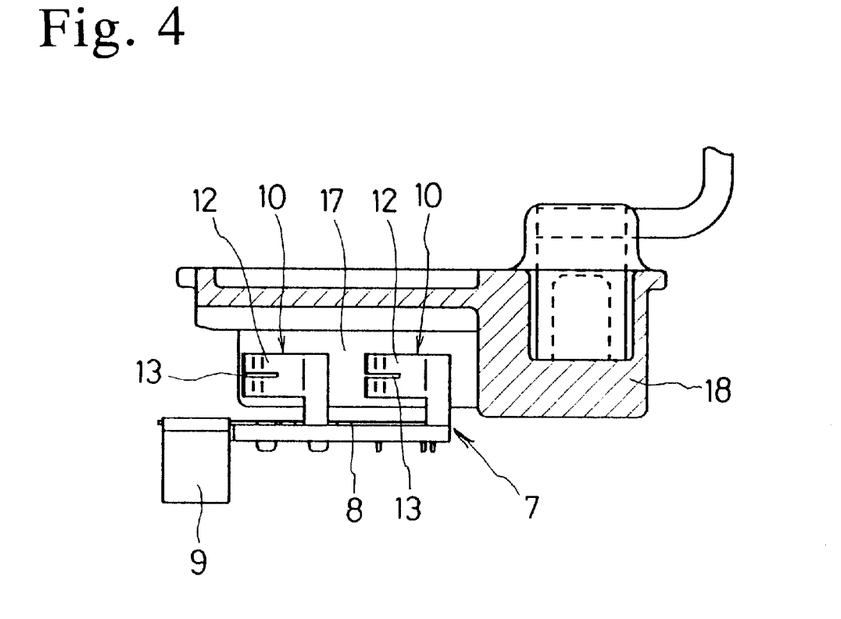
FIG. 4 shows a long male terminal of the electric power tool shown in FIG. 2 coupled to a female terminal of the battery pack shown in FIG. 1.

According to the structure of terminals thus constructed, when the battery pack 1 is slid into attachment with the bottom of the handle grip 14 of the power tool, the male terminals 17 enter the slits 5. Since the male terminals 17 are designed relatively long in this embodiment, the terminals 17 enter the gap between the respective front pairs of elastic plates 10 as the battery pack 1 is slid for attachment, and then push open the respective pairs of the contact pressure portions 12. The male terminals 17 continue to move rearward, entering the gap between the respective rear pairs of elastic plates 10 and pushing open the respective pairs of the contact pressure portions 12 to their rearmost set position. As shown in FIG. 4, when the battery pack 1 is set in place on the handle grip 14, each male terminal 17 is held with large contact pressure at two points between two pairs of elastic plates 10 to establish electrical contact with the female terminal 7. This effectively prevents heat buildup and chattering at the points where the terminals 7 and 17 are connected.

Figure 5:
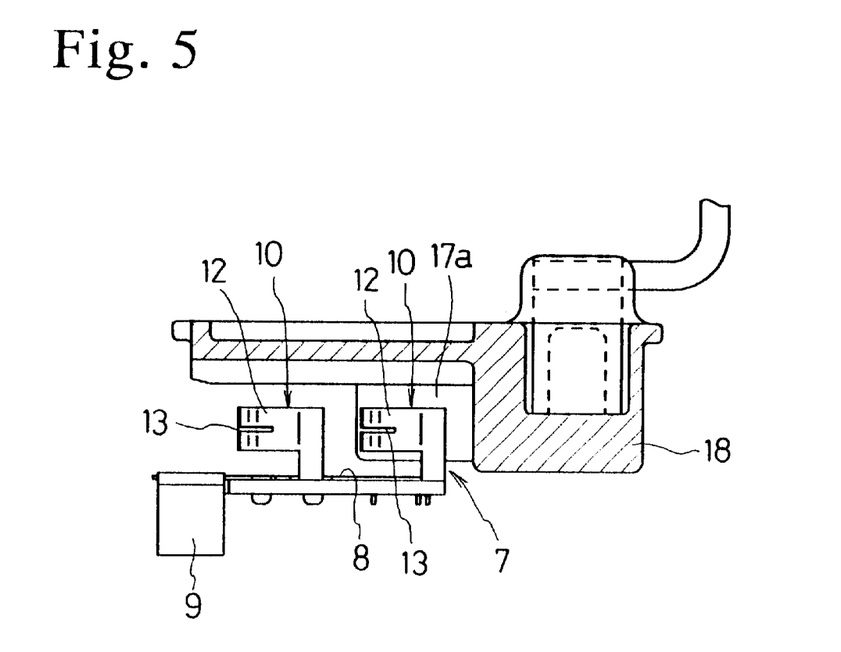
FIG. 5 shows a short male terminal of the electric power tool coupled to the female terminal of the battery pack shown in FIG. 1.

With reference to FIG. 5, if short terminals 17a are employed, then during manual attachment of the battery pack 1 to the handle grip 14, the terminals 17 enter the gap between the respective front pairs of elastic plates 10 and then push open the respective pairs of the contact pressure portions 12. When the battery pack 1 is set in place on the handle grip 14, each male terminal 17 is held by only one pair of elastic plates 10 to establish electrical contact with the female terminal 7.

As can be seen from the foregoing description, the battery pack 1 is provided with female terminals 7 each including plural pairs of elastic plates 10, whereas the charger and the power tool each include male terminals 17 and 17a having an appropriate length suitable for the specific applications. This arrangement permits selection of the appropriate level of contact pressure for the voltage or the amount of current employed, thereby effectively preventing heat buildup and chattering at the mating terminals. In addition, this selection of an appropriate level of contact pressure can be made simply by selecting the length of the male terminals, without the need to provide differently designed female terminals. This offers an additional advantage of reduction in manufacturing costs. Moreover, as the female terminals 7 and 7a are not exposed on the battery pack 1, short circuits can also be effectively prevented.

As cells eventually deteriorate and reach the end of their service life after going through so many cycles of charge and discharge, it is preferable for the terminals of the power tool and the charger to have longer service life. Male terminals generally have longer life than female terminals, as their thickness and hardness can be more freely selected. Accordingly, the arrangement of the foregoing embodiment, in which female terminals are mounted on the battery pack and male terminals on the charger and the tool, is the more logical and superior combination in view of service life of the two types of terminals.

Figure 6:
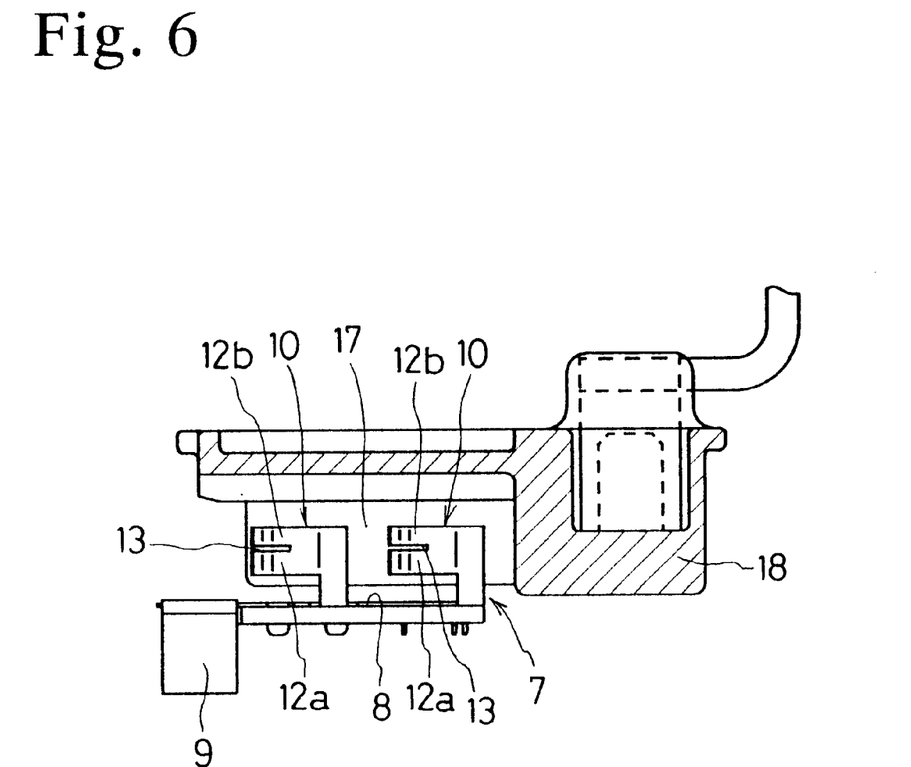
FIG. 6 shows an alternative contact pressure portion 12 of the female terminal of the battery pack shown in FIG. 1.

In the foregoing embodiment, two pairs of elastic or resilient plates 10 are employed in each female terminal 7. According to the present invention, however, it is contemplated to provide three or more pairs of elastic plates 10 in each terminal 7 and/or to provide male terminals 17 of different lengths to match the plural pairs of female terminals, thus realizing a wider range of contact pressure levels from which to choose. Moreover, according to the foregoing embodiment, as the slit 13 made in each elastic plate 10 laterally divides the plate into two equal and vertical widths, other manners of division are possible to suit specific applications. For example, as shown in FIG. 6, the slit can be made in a higher plane in order to provide a narrower upper piece 12b and a wider lower piece 12a, thereby providing different natural vibrations for the upper and lower pieces to reduce chattering due to vibration caused, for example, by the operation of the tool. This arrangement is particularly effective in minimizing or preventing chattering due to undesirable vibration caused by the operation of the tool. It should be noted, however, that the front and the rear pair of the elastic plates 10 need not have slits in the same plane; for example, horizontal slits in the elastic plates 10 of the front pairs may be located in a higher plane than those in the plates of the rear pairs, or vice versa. Moreover, not all elastic plate 10 pairs need be divided into two identical vertical widths; the front pairs and the rear pairs may be divided into two different widths.

According to the foregoing embodiment, the battery pack 1 is attached to the electric tool and the battery charger by sliding the pack along an outer surface of the tool or charger in a direction parallel to a top surface of the pack. It should be noted that the invention is applicable to other structures for attaching the battery pack to the tool or charger. For example, the structure of electric terminals according to the invention is applicable to an arrangement in which a portion of a battery pack is inserted into the electric tool and the charger.

EQUIVALENTS

It will thus be seen that the present invention efficiently attains the objects set forth above, among those made apparent from the preceding description. As other elements may be modified, altered, and changed without departing from the scope or spirit of the essential characteristics of the present invention, it is to be understood that the above embodiments are only an illustration and not restrictive in any sense. The scope or spirit of the present invention is limited only by the terms of the appended claims.

What is claimed is:

1. A structure of electrical terminals for establishing electrical contact between a battery pack and an electrical device by attachment of the battery pack to the electrical device, the structure comprising, a plurality of female terminals provided in the battery pack, and a plurality of male terminals provided in the electrical device and adapted to be coupled to the female terminals, wherein each of the female terminals includes at least two pairs of elastic plates, each pair of elastic plates being capable of holding one of the male terminals therebetween when the battery pack is attached to the electrical device, the elastic plate pairs of each female terminal being disposed along the path of movement of the male terminal when the battery pack is attached to the electrical device such that the number of elastic plate pairs of each female terminal that hold each male terminal therebetween is determined by the length of the male terminal along said path of movement.

2. A structure in accordance with claim 1 comprising two female terminals and two male terminals, each male terminal being adapted to be electrically connected to one of the two female terminals, and wherein the two female terminals are disposed in parallel to one another and are spaced apart by a first selected distance, and the two male terminals are disposed generally in parallel to one another and are spaced apart by the selected first distance.

3. A structure in accordance with claim 1, wherein each elastic plate includes a parallel portion extending parallel to said path of movement and a contact pressure portion bent at an angle to the parallel portion from one end of the parallel portion so as to extend into contact with the paired elastic plate at a point, and wherein each of the male terminals includes a strip having a sufficient length to come into contact with at least one of the elastic plate pairs at said point, separate the contact pressure portions, and reach beyond said point when the battery pack is attached to the electric device.

4. A structure in accordance with claim 3, wherein the parallel portions of each elastic plate pair are separated from each other by a selected space sufficient to dispose at least part of the strip of the corresponding male terminal therebetween, and wherein each pair of elastic plates is arranged such that, during attachment of the battery pack to the electric device, the male terminal is first slid relative to the electrical device to enter said space between the parallel portions, after which the male terminal separates the contact pressure portions at said point.

5. A structure in accordance with claim 1, wherein each elastic plate includes at least one slit therein formed in the direction substantially parallel to said path of movement of the male terminal so as to divide the contact pressure portion into a plurality of elastic pieces.

6. A structure in accordance with claim 5, wherein each contact pressure portion is divided into two elastic pieces with an identical width.

7. A structure in accordance with claim 5, wherein each contact pressure portion is divided into two elastic pieces with different widths.

8. A structure in accordance with claim 3, wherein the strip of each male terminal is sized and dimensioned so as to separate the two pairs of contact plates of the corresponding female terminal.

9. A structure in accordance with claim 3, wherein the strip of each male terminal is sized and dimensioned so as to separate only one pair of contact plates of the corresponding female terminal.

10. A structure in accordance with claim 3, wherein the strip of each male terminal has a substantially rectangular shape.

11. A structure in accordance with claim 1, wherein each pair of contact pressure portions applies a selected level of contact pressure on the male terminal when the battery pack is attached to the electric device.

12. A structure in accordance with claim 1, wherein the electrical device is selected from a group consisting of electrical power tools and battery chargers.

* * * * *

UNITED STATES PATENT AND TRADEMARK OFFICE
CERTIFICATE OF CORRECTION

PATENT NO.   : 6,350,149 B1
DATED        : February 26, 2002
INVENTOR(S)  : Nakane It is certified that error appears in the above-identified patent and that said Letters Patent is hereby corrected as shown below:

Column 1,
Line 25, replace: "Tile contact" with -- The contact --.

Signed and Sealed this

Twenty-third Day of July, 2002

Attest:

Attesting Officer

JAMES E. ROGAN
Director of the United States Patent and Trademark Office